United States Patent
Hsiao et al.

(10) Patent No.: US 9,513,972 B2
(45) Date of Patent: *Dec. 6, 2016

(54) TASK SCHEDULING BASED ON THERMAL CONDITIONS OF LOCATIONS OF PROCESSORS

(71) Applicant: LENOVO ENTERPRISE SOLUTIONS (SINGAPORE) PTE. LTD., New Tech Park (SG)

(72) Inventors: Yuan Shan Hsiao, Taipei (TW); Po-Chun BJ Ko, Taipei (TW); Alex CP Lee, Taipei (TW); YuhHung Liaw, Taipei (TW)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 71 days.

This patent is subject to a terminal disclaimer.

(21) Appl. No.: 14/301,868

(22) Filed: Jun. 11, 2014

(65) Prior Publication Data

US 2014/0298344 A1     Oct. 2, 2014

Related U.S. Application Data

(63) Continuation of application No. 14/168,782, filed on Jan. 30, 2014.

(30) Foreign Application Priority Data

Jan. 31, 2013  (TW) .............................. 102103699 A

(51) Int. Cl.
*G06F 9/50*     (2006.01)
(52) U.S. Cl.
CPC ............ *G06F 9/5094* (2013.01); *Y02B 60/142* (2013.01)

(58) Field of Classification Search
None
See application file for complete search history.

(56) References Cited

U.S. PATENT DOCUMENTS 7,877,751 B2   1/2011   Maeda et al.
8,224,639 B2   7/2012   Inoue
(Continued)

FOREIGN PATENT DOCUMENTS

TW    200602849 A   1/2006
TW    200604790 A   2/2006
(Continued)

OTHER PUBLICATIONS

Chrobak, Marek et al., "Algorithms for Temperature-Aware Task Scheduling in Microprocessor Systems", Algorithmic Aspects in Information and Management Lecture Notes in Computer Science vol. 5034, 2008, 4 pages.

(Continued)

*Primary Examiner* — Emerson Puente
*Assistant Examiner* — Jonathan R Labud
(74) *Attorney, Agent, or Firm* — Katherine Brown

(57) ABSTRACT

A method of prioritizing processing units in a system for task scheduling includes, for each processing unit of a plurality of processing units in the system, determining a value that represents a thermal condition of a location of the processing unit. It is determined which of the plurality of processing units is not fully loaded and is in a location with a most favorable thermal condition based on the value of the processing unit that represents thermal conditions of the location of the processing unit. A task is scheduled to the processing unit determined to be not fully loaded and in a location with a most favorable thermal condition based on the value of the processing unit that represents thermal conditions of the location of the processing unit.

15 Claims, 4 Drawing Sheets

(56) References Cited

U.S. PATENT DOCUMENTS

| | | |
|---|---|---|
| 8,463,456 B2 | 6/2013 | Carter et al. |
| 2002/0087903 A1 | 7/2002 | Hermerding et al. |
| 2005/0278520 A1 | 12/2005 | Hirai et al. |
| 2010/0161368 A1 | 6/2010 | Dawson et al. |
| 2010/0205607 A1 | 8/2010 | Shivanna et al. |
| 2010/0241881 A1 | 9/2010 | Barsness et al. |
| 2012/0124590 A1 | 5/2012 | Balakrishnan et al. |
| 2013/0013126 A1 | 1/2013 | Salsbery et al. |
| 2014/0215480 A1 | 7/2014 | Hsiao et al. |

FOREIGN PATENT DOCUMENTS

| | | |
|---|---|---|
| WO | 03083693 | 10/2003 |
| WO | 2011101294 | 8/2011 |

OTHER PUBLICATIONS

IBM, "Scheduling of Tasks for Thermal Characteristics Through Striping", Source: IP.com, Feb. 19, 2009, 1 page.

TASK SCHEDULING BASED ON THERMAL CONDITIONS OF LOCATIONS OF PROCESSORS

RELATED APPLICATIONS

This application is a Continuation of and claims the priority benefit of U.S. application Ser. No. 14/168,782 filed Jan. 30, 2014, which claims priority under 35 U.S.C. §119 from Taiwan Patent Application 102103699, filed on Jan. 31, 2013, which is incorporated by reference in its entirety.

BACKGROUND OF THE INVENTION

The present inventive subject matter generally relates to task scheduling in a multi-processor computer system.

Unlike a uniprocessor computer system, a multi-processor computer system follows different rules to meet specific needs when performing task scheduling. For example, to achieve equilibrium of loads between processors, Completely Fair Scheduler is in use under Linux. For more details, read "Inside the Linux 2.6 Completely Fair Scheduler: Providing fair access to CPUs since 2.6.23.", written by M. Tim Jones.

SUMMARY OF THE INVENTION

Embodiments of the inventive subject matter include a method of prioritizing processing units in a system for task scheduling, the method comprising, for each processing unit of a plurality of processing units in the system, determining a value that represents a thermal condition of a location of the processing unit. It is determined which of the plurality of processing units is not fully loaded and is in a location with a most favorable thermal condition based on the value of the processing unit that represents thermal conditions of the location of the processing unit. A task is scheduled to the processing unit determined to be not fully loaded and in a location with a most favorable thermal condition based on the value of the processing unit that represents thermal conditions of the location of the processing unit In an aspect, the present invention provides a method of task scheduling based on thermal conditions at locations of processors. In a multi-processor computer system, thermal conditions at the locations of the processors are not necessarily identical because of system layout constraint. For example, in the multi-processor computer system, some processors are positioned proximate to a cooling fan or a heat-generating device and thus have an advantage or disadvantage over the other processors in terms of the working environment. The aforesaid issue is not addressed by the conventional task scheduling techniques put forth according to the prior art.

In view of this, the present invention includes considerations given to thermal conditions (also known as cooling conditions) at the locations of processors when performing task scheduling on the processors. According to some embodiments of the present invention, a task which has a scheduling-related priority is scheduled to processors because of favorable thermal conditions at the locations of the processors. Hence, a task is scheduled to processors with favorable thermal conditions at the locations thereof rather than processors with unfavorable thermal conditions at the locations thereof to thereby reduce heat accumulated in the system, enhance overall system performance, and reduce power consumption incurred in heat dissipation.

The concept about "thermal conditions at the locations of processors" refers to ambient conditions at the locations (such as processor slots) of the processors, for example, thermal contribution or cooling contribution of a heating source (such as another processor, memory module, or power supply) outside the processor or a cooling source (such as a fan or heat dissipation module) to the locations of the processors, or the fact that the processors are upstream or downstream from a heat-dissipating path (such as a cooling air current) in the system.

For an illustrative purpose, "thermal conditions at locations of processors" as disclosed in the present invention in another aspect refer to ambient conditions which are considered at a system design stage and serve as default parameters. For example, they come in the form of a lookup table accessible by an operating system, thus dispensing the need to consider situations in which the processors at the locations are operating (for example, temperature and consumed power while operation is underway).

In another embodiment of the present invention, a task scheduling method applies to a computer system and comprises:

prioritizing the first processor and the second processor based on thermal conditions of the first zone and the second zone, respectively; and scheduling one of a plurality of tasks to the first processor and the second processor according to the prioritization performed in the aforesaid step.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the invention will be readily understood, a more particular description of the invention briefly described above will be rendered by reference to embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
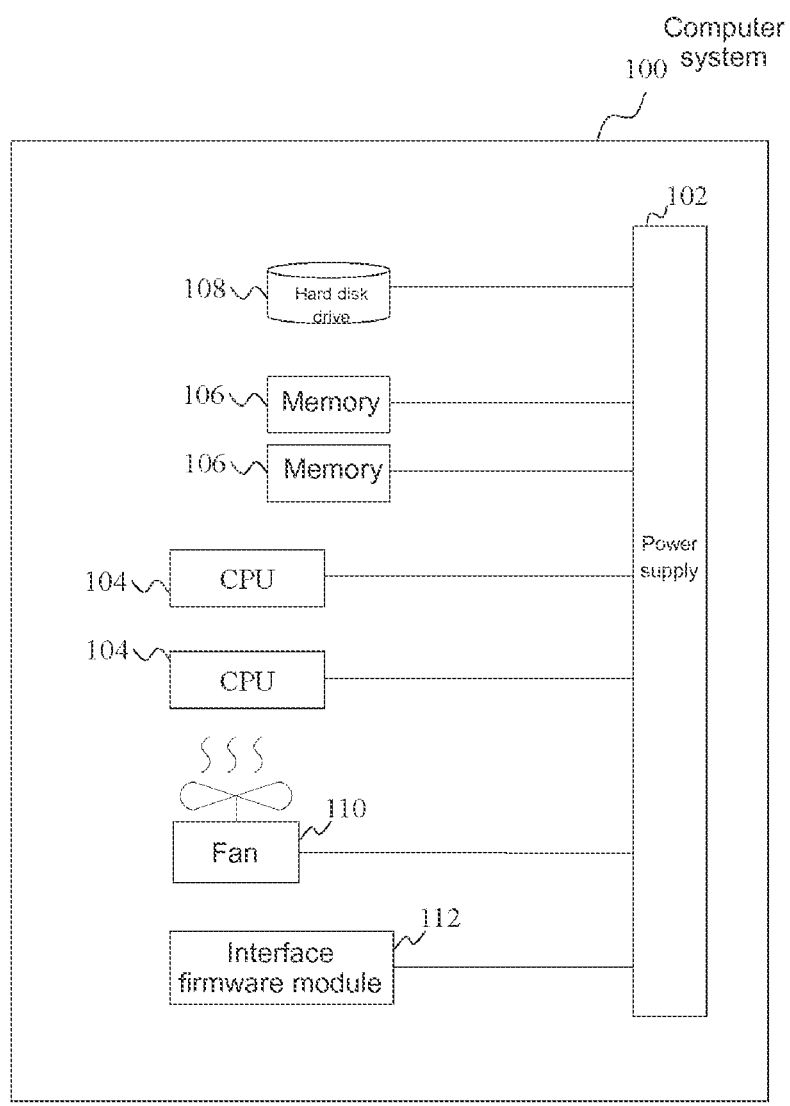
FIG. 1 is a schematic view of a computer system according to a specific embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as an apparatus, a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows the hardware framework of a computer system 100 in an embodiment. The computer system 100 comprises a power supply 102, a central processing unit (CPU) 104, a memory 106, a hard disk drive 108, a fan 110, and an interface firmware module 112. For information about the other fundamental framework and components of the computer system 100, make reference to a typical personal computer or server, such as IBM's System X, Blade Center or eServer. Details not relevant to the present invention are not described herein for the sake of brevity.

When the computer system 100 is operating, the power supply 102 supplies DC power to the central processing unit 104, memory 106, hard disk drive 108, and fan 110. The power supply 102, central processing unit 104, memory 106, and hard disk drive 108 generate high heat while operating, and are cooled down by the fan 110.

Figure 2:
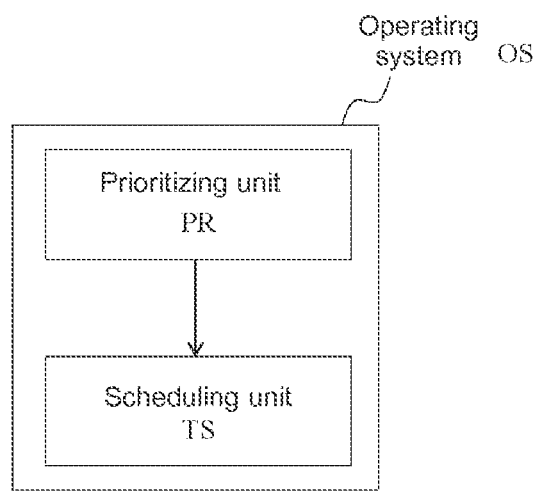
FIG. 2 is a schematic view of an operating system in the computer system according to a specific embodiment of the present invention.

The computer system 100 is a multi-processor system and has a plurality of central processing units 104. One or more central processing units 104 execute an operating system OS (such as Linux). Referring to FIG. 2, the operating system OS comprises a prioritizing unit PR and a scheduling unit TS. More related details are described later.

Although FIG. 1 depicts two central processing units 104, the present invention is not limited thereto. For details of the computer system 100, make reference to IBM System x3755 M3 equipped with four AMD Opteron 6200 series processors each having 16 cores (maximum 2.5 GHz), 12 cores (maximum 2.6 GHz), or 8 cores (maximum 3.0 GHz). For more information about IBM System x3755 M3, read IBM System x 3755 M3:IBM Redbooks Product Guide, which is incorporated herein by reference.

The interface firmware module 112 may be for example, but not limited to, a read only memory (ROM) with Extensible Firmware Interface (EFI), Universal Extensible Firmware interface (UEFI), Basic Input/Output System (BIOS) or other interface. However, the present invention is not limited hereto.

In this embodiment, interface firmware module 112 maintains hardware data, such as ACPI table, in the computer system 100, such that the hardware data are accessible by the operating system OS (shown in FIG. 2) of the computer system 100. Details of ACPI table are described in ACPI Table Storage Specification (v091) published by Intel and are not reiterated herein for the sake of brevity.

Figure 3:
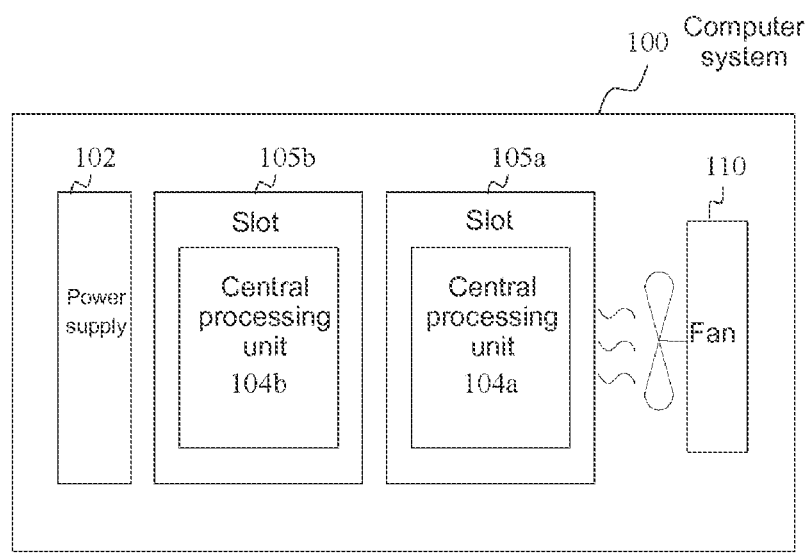
FIG. 3 is a schematic view of the layout in the computer system according to a specific embodiment of the present invention.

FIG. 3 further shows system layout in the computer system 100. For an illustrative purpose, FIG. 3 is simplified in showing the power supply 102, two central processing units (CPU) 104a, 104b, and the fan 110. Referring to FIG. 3, the two central processing units 104a, 104b are mounted on processor slots 105a, 105b, respectively. The actual details of the system layout are described in the aforesaid technical document, that is, IBM System x 3755 M3:IBM Redbooks Product Guide. The operating system of the computer system 100 is executed either by the central processing unit 104a and/or central processing unit 104b, or by any central processing unit (not shown in FIG. 3) other than the central processing units 104a, 104b.

In the embodiment illustrated with FIG. 3, thermal conditions of the processor slot 105a are more favorable than that of the processor slot 105b for reasons as follows: the processor slot 105a is positioned proximate to the cooling fan 110 and thus receives the cooling air current to a great extent; and, with the power supply 102 generating high heat, the processor slot 105b positioned proximate to the power supply 102 is subjected to relatively great thermal effect from the power supply 102. At the system design stage, a system designer uses the distance to the cooling/heating sources or sophisticated heat flow simulation in analyzing the thermal conditions of processor slots 105a, 105b, assigning different effective values to different factors in thermal conditions, as shown in Table 1 below, and pre-storing the assigned effective values in interface firmware module 112 (such as ACPI DSTD table), such that the stored effective values can be accessed by the operating system OS (see FIG. 2).

TABLE 1

| factor in thermal conditions | slot 105a | slot 105b |
|---|---|---|
| power supply 102 | 1 | 2 |
| fan 110 | 2 | 3 |
| total | 3 | 5 |

Effective values arising from a single factor (such as power supply) in thermal conditions mainly reflect the relative difference in the effects on thermal conditions of processor slot 105a and processor slot 105b. Hence, when considering the difference in the overall thermal conditions between processor slot 105a and processor slot 105b, it is feasible to add together the effective values of different factors in thermal conditions. However, a system designer can assign different weights to different factors in thermal conditions, though the present invention is not limited thereto.

In another embodiment, processor slots 105a, 105b are usually adjacent to each other, and processors 104a, 104b mounted thereon generate plenty of heat while operating and thus affect each other. As a result, if specific data (such as nominal consumed power) pertaining to processors 104a, 104b are known during the system design state, it will be feasible to give considerations to the effect of operation of processors fixed to adjacent slots on the slot thermal conditions as illustrated with Table 2 below. For example, it is feasible to consider the effect on slot 105a of operation of central processing unit 104b fixed to slot 105b. Processors 104a, 104b are not necessarily identical, and thus processors 104a, 104b are likely to have different effects on slot thermal conditions, as illustrated with Table 2 below.

TABLE 2

| factor in thermal condition | slot 105a | slot 105b |
|---|---|---|
| power supply 102 | 1 | 2 |
| fan 110 | 2 | 3 |
| central processing unit 104a | 0 | 2 |
| central processing unit 104b | 5 | 0 |
| total | 8 | 7 |

Hence, all the thermal conditions of slot 105a and slot 105b can be quantized and thereby be subjected to subsequent automated judgment or applied to data processing. Not only is it feasible, as described before, to simulate and specify all the thermal conditions of slot 105a and slot 105b during the system design stage, but factors in thermal conditions can also be measured and identified while the system is operating.

The task scheduling method in an embodiment of the present invention is illustrated with the flow chart shown in FIG. 4 and comprises the steps as follows:

Step 400: a system designer determines respective thermal conditions of processor slots 105a, 105b and specifies corresponding values to be written to or updated in the interface firmware module 112. Alternatively, the system designer specifies corresponding values for the respective thermal conditions of slots 105a, 105b according to the model numbers of various hardware components (such as fans of different powers), such that the operating system OS selects one of the values as needed. Preferably, interface firmware module 112 has ACPI DSTD table for storing thermal condition values of slots 105a, 105b, and the stored thermal condition values are accessible by the operating system OS through UEFI.

Step 402: computer system 100 boots, wherein operating system OS undergoes initialization, accesses interface firmware module 112 through and selects appropriate thermal condition values of processor slots 105a, 105b (see Table 1 or Table 2).

Step 404: the prioritizing unit PR in operating system OS prioritizes processors 104a, 104b mounted on processor slots 105a, 105b according to thermal condition values attributed to processor slots 105a, 105b and obtained in step 402. In this embodiment, the prioritizing unit PR gives priority to the processor mounted on the processor slot with favorable thermal conditions (i.e., with the least total of thermal condition values, as shown in Table 1 or Table 2). Take the thermal condition values in Table 2 as an example, the processor 104*b* mounted on processor slot 105*b* has priority over the processor 104*a* mounted on processor slot 105*a*. Although FIG. 3 shows only two processors 104*a*, 104*b* and two processor slots 105*a*, 105*b* corresponding thereto for an illustrative purpose, in an embodiment where computer system 100 has at least three processors (and corresponding processor slots), the prioritizing unit PR prioritizes all the processors according to the thermal conditions of the processor slots, respectively.

Step 406: the scheduling unit TS in operating system OS determines whether processor 104*b* is fully loaded according to the priority provided by the prioritizing unit PR in step 404, for example, processor 104*b* has priority over processor 104*a*. If processor 104*b* is not fully loaded, the task will be scheduled to processor 104*b* (step 408). If processor 104*b* is fully loaded, the task will be scheduled to the processor with the second priority (i.e., processor 104*a*) in the prioritization performed by the prioritizing unit PR (step 410).

Figure 4:
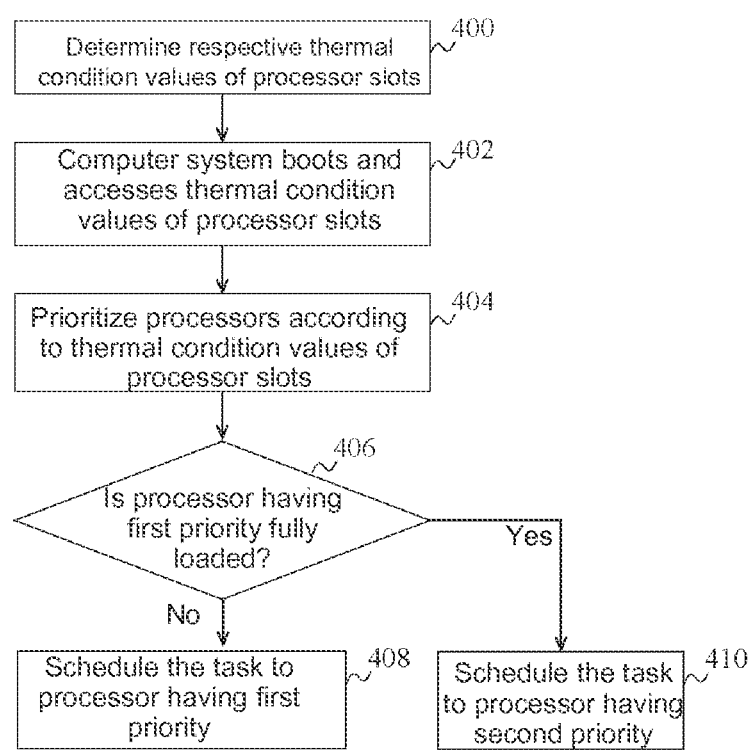
FIG. 4 is a flow chart of a method according to a specific embodiment of the present invention.
Figure 5:
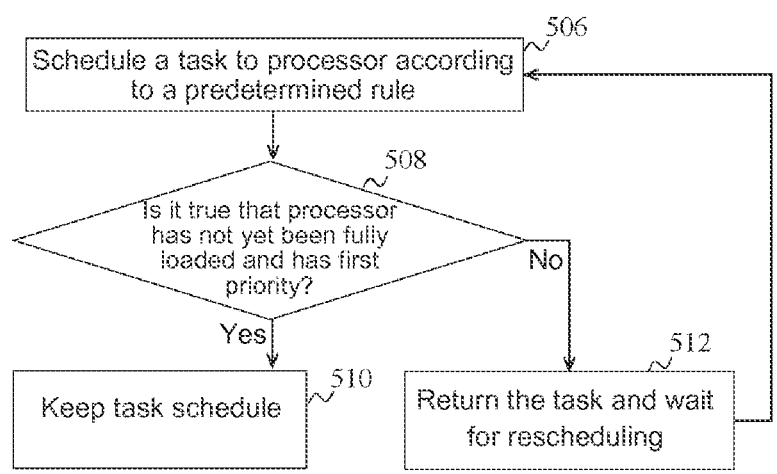
FIG. 5 is a flow chart of the method according to another specific embodiment of the present invention.

The implementation of the task scheduling method performed with the scheduling unit TS in operating system OS, illustrated with the flow chart shown in FIG. 5, and disclosed in another embodiment of the present invention, can continue from step 404 of FIG. 4, when compared with step 406.

Step 506: the scheduling unit TS in operating system OS schedules a task to processor 104*a* according to a predetermined rule (such as round-robin algorithm). In this step, it is feasible for the scheduling unit TS to first ignore the prioritization performed by the prioritizing unit PR.

Step 508: in an embodiment, the scheduling unit TS determines whether processor 104*a* has first priority in the prioritization performed by the prioritizing unit PR in step 404. In another embodiment, the scheduling unit TS determines whether processor 104*a* has not yet been fully loaded and whether processor 104*a* has first priority in the prioritization performed by the prioritizing unit PR in step 404. In the two aforesaid embodiments, keep the task schedule of step 506 (step 510) if the determination is affirmative, and a negative determination indicates either that processor 104*a* has been fully loaded or that processor 104*a* has not yet been fully loaded but does not have first priority, thereby returning the task to the scheduling unit TS (step 512) and going back to step 506 for rescheduling the task to another processor until the process flow of the method goes to step 510.

In the aforesaid embodiments, task scheduling is based on the thermal conditions (or ambient conditions) of the slots. According to the present invention, no consideration is given to the heat generated from processors mounted on the slots, as far as the thermal conditions of the slots are concerned. In Table 2, considerations are given to the processors mounted on adjacent slots. For example, for the thermal condition of the slot 105A, no consideration is given to the heat generated from the processor 104A but to the processor 104B which is mounted on the adjacent slot 105*b*. However, the teaching (i.e., the thermal conditions of the slots) of the present invention can also be integrated into the prior art in terms of task scheduling based on the temperature (i.e., the present thermal conditions) of the processors mounted on the slots, and the present invention is not limited thereto.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method of prioritizing processing units in a system for task scheduling, the method comprising:
for each processing unit of a plurality of processing units in the system, determining a value that represents a thermal condition of a location of the processing unit;
determining which of the plurality of processing units is not fully loaded and is in a location with a most favorable thermal condition based on the value of the processing unit that represents thermal conditions of the location of the processing unit, comprising determining whether the processing unit is fully loaded and is at a location with a most favorable thermal condition with respect to the plurality of processing units based on the value that represents thermal condition of the location of a first processing unit of the plurality of processing units; and
scheduling a task to the processing unit determined to be not fully loaded and in a location with a most favorable thermal condition based on the value of the processing unit that represents thermal conditions of the location of the processing unit,
wherein the task is scheduled to the first processing unit if the first processing unit is not fully loaded and is at the location with the most favorable thermal condition according to the value that represents the thermal condition of the location of the first processing unit,
wherein the task is scheduled to a different processing unit that is not fully loaded and is at the location with the most favorable thermal condition according to the value that represents the thermal condition of the location of the different processing unit.

2. The method of claim 1, wherein said determining, for each processing unit of the plurality of processing units in the system, the value that represents thermal condition of the location of the processing unit comprises determining the value that indicates thermal conditions of the location based on location of a socket with respect to at least one of a cooling device and a power supply.

3. The method of claim 2, wherein said determining, for each processing unit of the plurality of processing units in the system, the value that represents thermal condition of the location of the processing unit comprises determining a cumulative value derived from a first value that represents thermal condition of the socket location based on proximity to the power supply and from a second value that represents thermal condition of the socket location based on proximity to the cooling device.

4. The method of claim 2, wherein said determining, for each processing unit of the plurality of processing units in the system, the value that represents thermal condition of the location of the processing unit also comprises determining a value that represents thermal condition of a location based on performance of an adjacent one of the plurality of processing units.

5. The method of claim 1, wherein the values that represent thermal conditions of the plurality of processing units are relative among the plurality of processing units.

6. A non-transitory computer-readable data storage medium storing computer-executable code executable by a system including a plurality of processing units to perform a method comprising:
- for each processing unit of the plurality of processing units, determining a value that represents a thermal condition of a location of the processing unit;
- determining which of the plurality of processing units is not fully loaded and is in a location with a most favorable thermal condition based on the value of the processing unit that represents thermal conditions of the location of the processing unit, comprising determining whether the processing unit is fully loaded and is at a location with a most favorable thermal condition with respect to the plurality of processing units based on the value that represents thermal condition of the location of a first processing unit of the plurality of processing units; and
- scheduling a task to the processing unit determined to be not fully loaded and in a location with a most favorable thermal condition based on the value of the processing unit that represents thermal conditions of the location of the processing unit,
- wherein the task is scheduled to the first processing unit if the first processing unit is not fully loaded and is at the location with the most favorable thermal condition according to the value that represents the thermal condition of the location of the first processing unit,
- wherein the task is scheduled to a different processing unit that is not fully loaded and is at the location with the most favorable thermal condition according to the value that represents the thermal condition of the location of the different processing unit.

7. The non-transitory computer-readable data storage medium of claim 6, wherein said determining, for each processing unit of the plurality of processing units in the system, the value that represents thermal condition of the location of the processing unit comprises determining the value that indicates thermal conditions of the location based on location of a socket with respect to at least one of a cooling device and a power supply.

8. The non-transitory computer-readable data storage medium of claim 7, wherein said determining, for each processing unit of the plurality of processing units in the system, the value that represents thermal condition of the location of the processing unit comprises determining a cumulative value derived from a first value that represents thermal condition of the socket location based on proximity to the power supply and from a second value that represents thermal condition of the socket location based on proximity to the cooling device.

9. The non-transitory computer-readable data storage medium of claim 7, wherein said determining, for each processing unit of the plurality of processing units in the system, the value that represents thermal condition of the location of the processing unit also comprises determining a value that represents thermal condition of a location based on performance of an adjacent one of the plurality of processing units.

10. The non-transitory computer-readable data storage medium of claim 6, wherein the values that represent thermal conditions of the plurality of processing units are relative among the plurality of processing units.

11. A system comprising:
- a plurality of processing units;
- a non-transitory computer-readable data storage medium storing computer-executable code executable by the plurality of processing units to:
  - for each processing unit of the plurality of processing units, determine a value that represents a thermal condition of a location of the processing unit;
  - determine which of the plurality of processing units is not fully loaded and is in a location with a most favorable thermal condition based on the value of the processing unit that represents thermal conditions of the location of the processing unit, including determining whether the processing unit is fully loaded and is at a location with a most favorable thermal condition with respect to the plurality of processing units based on the value that represents thermal condition of the location of a first processing unit of the plurality of processing units; and
  - schedule a task to the processing unit determined to be not fully loaded and in a location with a most favorable thermal condition based on the value of the processing unit that represents thermal conditions of the location of the processing unit,
- wherein the task is scheduled to the first processing unit if the first processing unit is not fully loaded and is at the location with the most favorable thermal condition according to the value that represents the thermal condition of the location of the first processing unit,
- wherein the task is scheduled to a different processing unit that is not fully loaded and is at the location with the most favorable thermal condition according to the value that represents the thermal condition of the location of the different processing unit.

12. The system of claim 11, wherein the computer-executable code is executable by the plurality of processing units to determine, for each processing unit of the plurality of processing units in the system, the value that represents thermal condition of the location of the processing unit by determining the value that indicates thermal conditions of the location based on location of a socket with respect to at least one of a cooling device and a power supply.

13. The system of claim 12, wherein the computer-executable code is executable by the plurality of processing units to determine, for each processing unit of the plurality of processing units in the system, the value that represents thermal condition of the location of the processing unit by determining a cumulative value derived from a first value that represents thermal condition of the socket location based on proximity to the power supply and from a second value that represents thermal condition of the socket location based on proximity to the cooling device.

14. The system of claim 12, wherein the computer-executable code is executable by the plurality of processing units to determine, for each processing unit of the plurality of processing units in the system, the value that represents thermal condition of the location of the processing unit by determining a value that represents thermal condition of a location based on performance of an adjacent one of the plurality of processing units.

15. The system of claim 11, wherein the values that represent thermal conditions of the plurality of processing units are relative among the plurality of processing units.

* * * * *